United States Patent
Kluge

(10) Patent No.: US 11,261,668 B2
(45) Date of Patent: *Mar. 1, 2022

(54) CUTTING RATE CONTROL FOR AN ICE DRILL

(71) Applicant: A.W.C. Distributing, Inc., Minneapolis, MN (US)

(72) Inventor: Douglas J. Kluge, Clearwater, MN (US)

(73) Assignee: A.W.C. Distributing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,867

(22) Filed: Jan. 27, 2020

(65) Prior Publication Data

US 2020/0362639 A1 Nov. 19, 2020

Related U.S. Application Data

(63) Continuation of application No. 15/490,431, filed on Apr. 18, 2017, now Pat. No. 10,544,626.

(60) Provisional application No. 62/390,982, filed on Apr. 18, 2016.

(51) Int. Cl.
| | |
|---|---|
| *A01K 97/01* | (2006.01) |
| *E21B 10/44* | (2006.01) |
| *E21B 7/00* | (2006.01) |
| *E21B 10/633* | (2006.01) |
| *E21B 11/00* | (2006.01) |

(52) U.S. Cl.
CPC .............. *E21B 10/44* (2013.01); *A01K 97/01* (2013.01); *E21B 7/008* (2013.01); *E21B 10/633* (2013.01); *E21B 11/005* (2013.01)

(58) Field of Classification Search
CPC ........ E21B 10/44; E21B 7/008; E21B 10/633; E21B 11/005; A01K 97/01
See application file for complete search history.

(56) References Cited

U.S. PATENT DOCUMENTS

| | | | |
|---|---|---|---|
| 137,744 | A | 4/1873 | West |
| 2,393,282 | A | 1/1946 | Berlin |
| 2,591,233 | A | 4/1952 | Browne |
| 2,838,285 | A | 6/1958 | Gredell |
| 3,051,253 | A | 8/1962 | McCann |
| 3,175,630 | A | 3/1965 | Hein et al. |
| 3,387,674 | A | 6/1968 | Watson |
| RE27,498 | E * | 10/1972 | Watson .................. E21B 10/44 175/394 |
| 4,821,818 | A | 4/1989 | Mefferd |
| 5,038,870 | A | 8/1991 | Kuronen |

(Continued)

FOREIGN PATENT DOCUMENTS

EP 3216974 B1 12/2018

*Primary Examiner* — Brad Harcourt
(74) *Attorney, Agent, or Firm* — Merchant & Gould P.C.

(57) ABSTRACT

A cutting head includes a main body that is attachable to an ice drill shaft at a top side. The main body includes a bottom side that has a bottom peripheral surface. The cutting head includes at least one cutting edge that is disposed on the main body. The cutting edge is configured to perform a cutting operation at the bottom side of the main body. The cutting head includes a cutting rate control pad that is disposed on the bottom side of the main body. The cutting rate control pad extends away from the bottom peripheral surface.

20 Claims, 10 Drawing Sheets

(56) References Cited

U.S. PATENT DOCUMENTS

| | | |
|---|---|---|
| 6,502,649 B1 | 1/2003 | Havel |
| 7,946,355 B1 | 5/2011 | Kluge |
| 9,270,152 B2 | 2/2016 | Schamberger et al. |
| 10,544,626 B2 * | 1/2020 | Kluge .................. E21B 11/005 |
| 2017/0175449 A1 * | 6/2017 | Roikonen ............... E21B 7/008 |

* cited by examiner

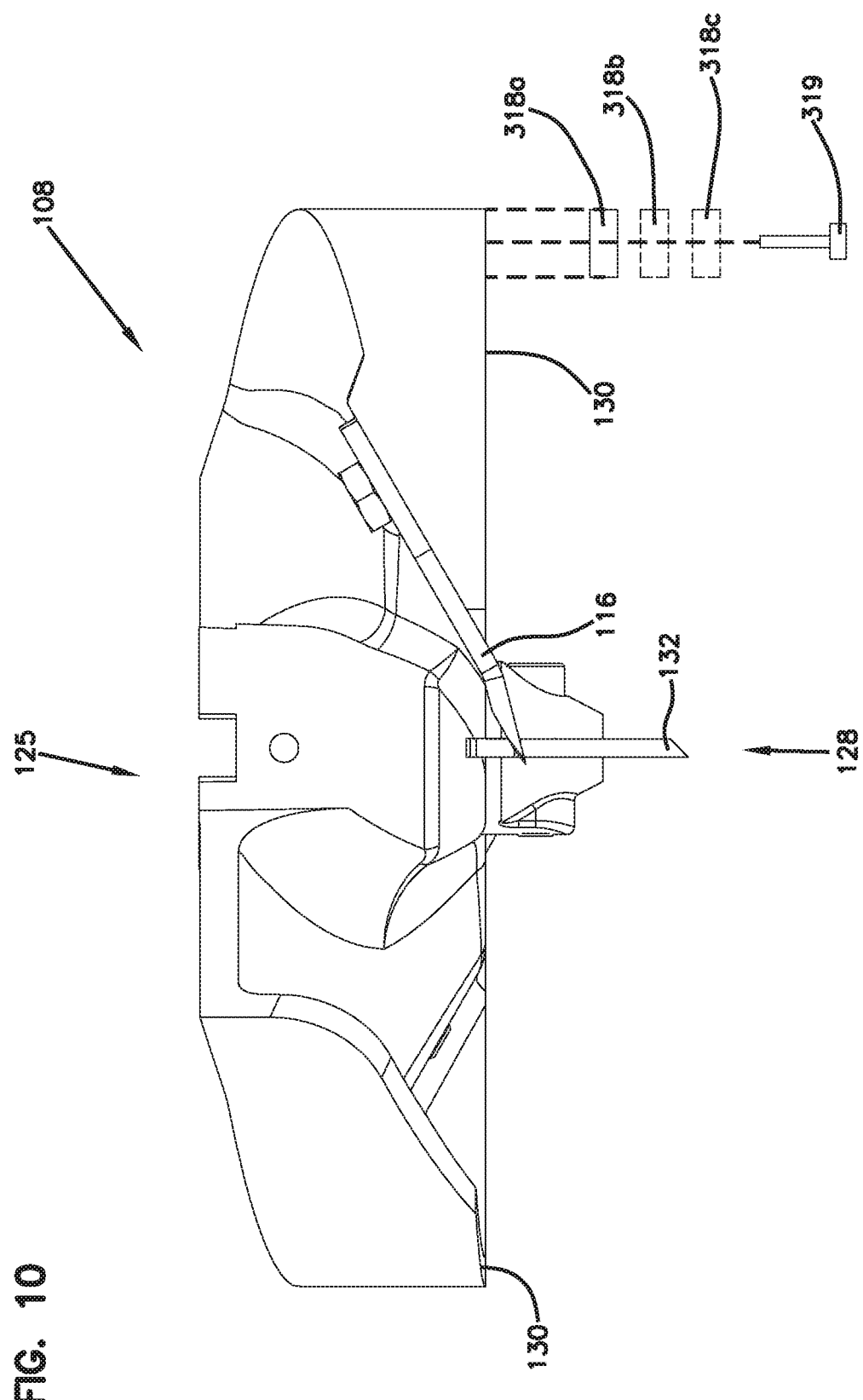

CUTTING RATE CONTROL FOR AN ICE DRILL

CROSS REFERENCE TO RELATED APPLICATION

This application is a continuation of U.S. patent application Ser. No. 15/490,431, filed Apr. 18, 2017, now U.S. Pat. No. 10,544,626; which claims the benefit of U.S. Provisional Application No. 62/390,982, filed Apr. 18, 2016, and titled "ICE DRILL CUT RATE CONTROL," the disclosures of which are hereby incorporated herein by reference.

BACKGROUND

Ice drills are used to create holes in frozen bodies of water so that a fisherman can access the unfrozen water underneath the ice. Gas powered ice drills have traditionally been the tool of choice for drilling large ice fishing holes, while manual, hand-twist augers have served those that were happy with a small ice fishing hole. Recently, battery powered ice drills have gained acceptance due to their light weight.

When temperatures fluctuate, the cutting characteristics of the ice also change. For example, the ice at the bottom of the ice fishing hole behaves differently than the ice at the top of the hole. The ice at the bottom of the hole can be relatively soft and cause the ice drill to grab or stick at break through. Therefore, to break through, sufficient power is required from the ice drill. However, specifically with respect to the electric ice drill, the more power that is expended drilling and breaking through the hole, the shorter the life span (i.e., battery life) of the ice drill. Therefore, improvement in ice drill technology is desired.

SUMMARY

The present disclosure relates generally to an ice drill. In one possible configuration, and by non-limiting example, an ice drill cutting head having cutting rate control pads disposed on the bottom side is disclosed.

In a one aspect of the present disclosure, a cutting head for an ice drill is disclosed. The cutting head includes a main body that is attachable to an ice drill shaft at a top side. The main body includes a bottom side that has a bottom peripheral surface. The cutting head includes at least one cutting edge that is disposed on the main body. The cutting edge is configured to perform a cutting operation at the bottom side of the main body. The cutting head includes a cutting rate control pad that is disposed on the bottom side of the main body. The cutting rate control pad extends away from the bottom peripheral surface.

In another aspect of the present disclosure, an ice drill is disclosed. The ice drill includes a motor and a drive shaft attached to the motor at a first end. The ice drill includes an auger assembly that is attached to the drive shaft and a cutting head attached to a second end of the drive shaft. The cutting head includes a main body that has a top side and a bottom side, the bottom side including a bottom peripheral surface. The cutting head includes at least one cutting edge that is disposed on the main body. The cutting edge is configured to perform a cutting operation at the bottom side of the main body. The cutting head includes a cutting rate control pad disposed on the bottom side of the main body. The cutting rate control pad extends away from the bottom peripheral surface.

In another aspect of the present disclosure, a method of controlling a cutting rate of an ice drill is disclosed. The method includes providing a motor that is attached to a cutting head. The cutting head includes a main body that has a top side and a bottom side. The bottom side includes a bottom peripheral surface. The cutting head includes at least one cutting edge disposed on the main body. The cutting edge is configured to perform a cutting operation at the bottom side of the main body. The cutting head includes a cutting rate control pad disposed on the bottom side of the main body. The cutting rate control pad extends away from the bottom peripheral surface. The method includes rotating the cutting head using the motor. The method also includes cutting a hole in an ice surface using the cutting head.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 10 illustrates a side view of the cutting head of the ice drill of FIG. 1 utilizing a cutting rate control pad system.

DETAILED DESCRIPTION

Figure 1:
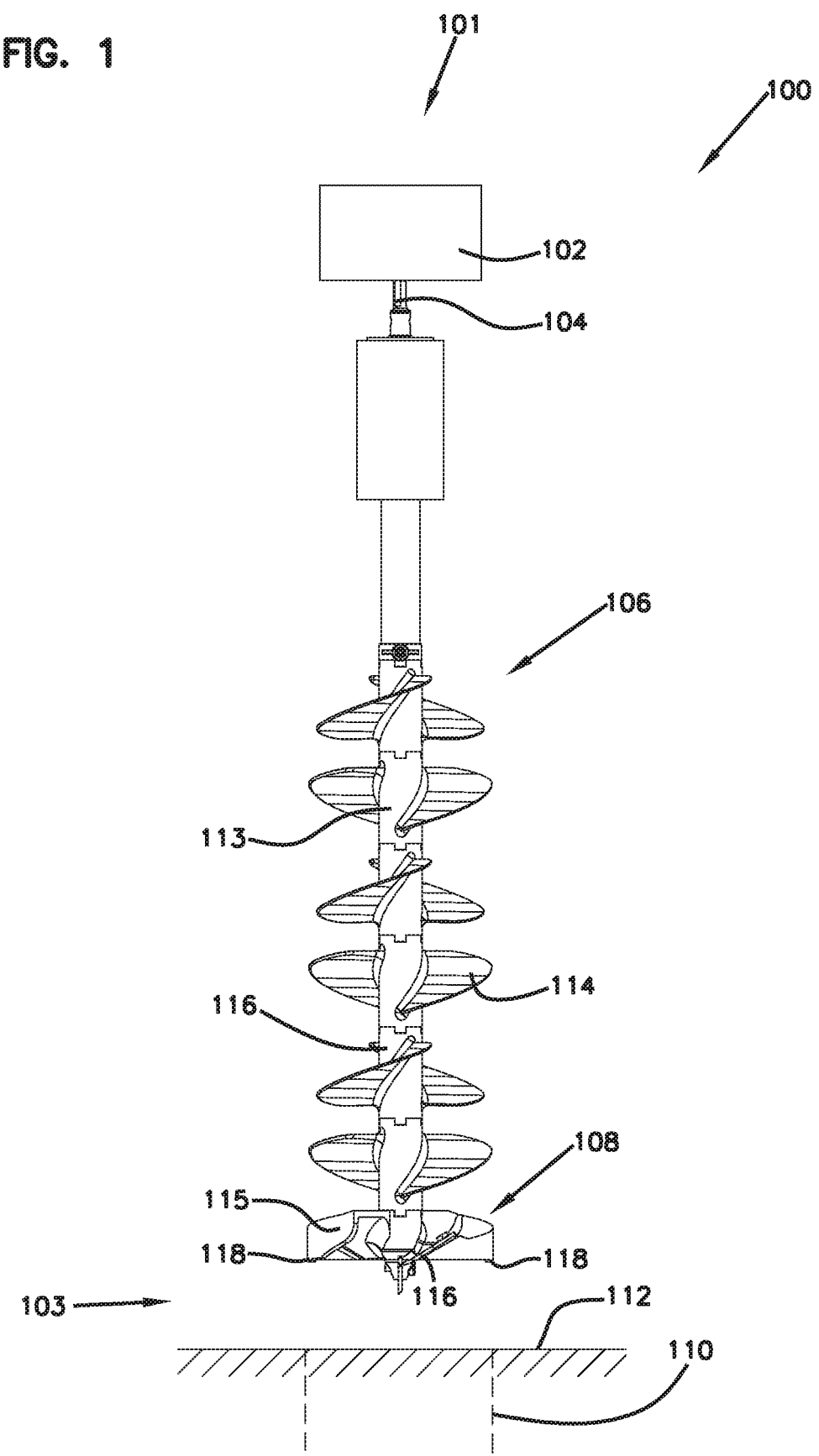
FIG. 1 illustrates a schematic view of ice drill according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The ice drill disclosed herein has many advantages. The cutting head of the ice drill includes cutting rate control pads that are configured to control the cutting rate of the ice drill. While applicable in a variety of different types of ice drills, the cutting rate control pads are specifically advantageous in electrically powered ice drills. By controlling the cutting rate of the electric ice drill, a hole in the ice can be drilled efficiently to conserve battery power. Further, the cutting rate control pads also reduce the amount of effort it takes for the operator to drill the hole.

FIG. 1 shows a side view of an ice drill 100. The ice drill includes a motor 102, a drive shaft 104, an auger assembly 106, and a cutting head 108. In some examples, the ice drill 100 can be powered manually and not include a motor. In the depicted example, the motor 102 is configured to rotate the drive shaft 104, which rotates the auger assembly 106, which rotates the cutting head 108. In operation, the cutting head 108 cuts a hole 110 in an ice surface 112 as it rotates, and the auger assembly 106 removes ice shavings from the hole 110 as its rotates.

The ice drill 100 includes a top 101 and a bottom 103. Throughout this disclosure, references to orientation (e.g., behind, above, below, high, low, top, bottom, under, underside, etc.) of structural components shall be defined by that component's positioning in FIG. 1 relative to, as applicable, the top 101 and bottom 103 of the ice drill 100, regardless of how the ice drill 100 may be held and regardless of how that component may be situated on its own (i.e., when separated from the ice drill 100).

The motor 102 can be a variety of different types. In some examples, the motor is a gas powered motor. In other examples, the motor 102 is an electric motor. In other examples, the motor 102 is a cordless electric motor that is battery powered. For example, the motor 102 can be a cordless electric power drill. The motor 102 includes an output shaft (not shown) that is connectable to drive shaft 104.

The drive shaft 104 is configured to transfer torque from the motor 102 to the cutting head 108. In some examples, the drive shaft 104 can be configured to quickly couple with the motor 102. In some examples, the drive shaft 104 has a non-circular cross-section.

The auger assembly 106 includes a plurality of auger wings 114 that are configured to transport ice shavings from a bottom to a top of the hole 110 during an ice drilling operation. In some examples, the auger assembly 106 includes a plurality of flights 113 that are used to selectively alter the length of the auger assembly 106.

The cutting head 108 is configured to be removable from the auger assembly 106. In some examples, the cutting head 108 can be used without an auger assembly. The cutting head 108 is configured to bore the hole 110 in the ice surface 112. Specifically, the cutting head 108 includes a main body 115 with at least one cutting blade 116 attached thereto. The main body 115 of the cutting head 108 also includes cutting rate control pads 118 that are configured to control the cutting rate of the cutting head 108. The cutting rate control pads 118 prevent the at least one cutting blade 116 from over penetrating the ice surface 112. The cutting rate control pads 118 will be discussed in more detail below.

Figure 2:
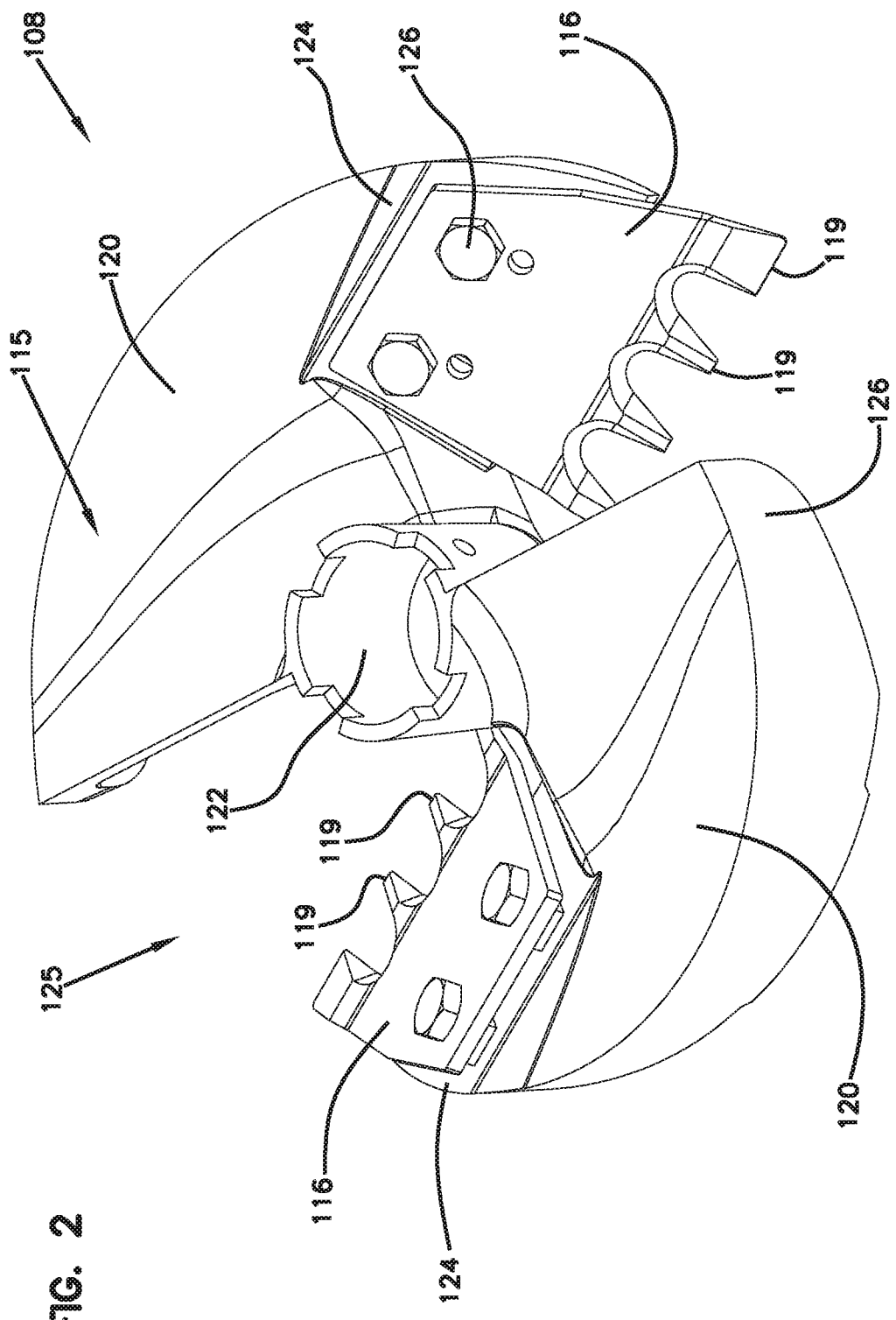
FIG. 2 illustrates a top perspective view of a cutting head of the ice drill of FIG. 1.

FIG. 2 shows a top perspective view of the cutting head 108. At a top side 125 of the main body 115, the cutting head 108 is configured to attach to drive shaft 104 via the auger assembly 106.

The main body 115 of the cutting head 108 includes a pair of wings 120 extending outwardly from a central body 122. The wings 120 each include a mounting location 124 for a cutting blade 116. The mounting locations 124 are positioned on the wings 120 such that each cutting blade 116 can be mounted in a way to allow it to extend from at least an outer edge 126 of the cutting head 108 to the central body 122. In some examples, the cutting blades 116 can be permanently fixed to the mounting locations 124. In other examples, the cutting blades 116 can be removably attached to the mounting locations 124 so as to facilitate replacement as needed. In some examples, the cutting blades 116 are attached to the mounting locations 124 via at least one fastener 127.

The main body 115 of the cutting head 108 can be constructed of a variety of different materials. For example, the main body 115 can be constructed of metal or plastic. In some examples, the main body 115 is constructed of aluminum. In some examples, the main body 115 can be cast aluminum. In other examples, the main body 115 can be milled from a block of aluminum. In still other examples, the main body 115 is forged aluminum.

The cutting blades 116 can be constructed of a variety of materials. In some examples, the cutting blades 116 are constructed of a high carbon steel. In some examples, the blades 116 are serrated blades. The cutting blades 116 include a leading edge 119 that is the edge that first contacts the ice surface 112 to begin a cutting operation.

Figure 3:
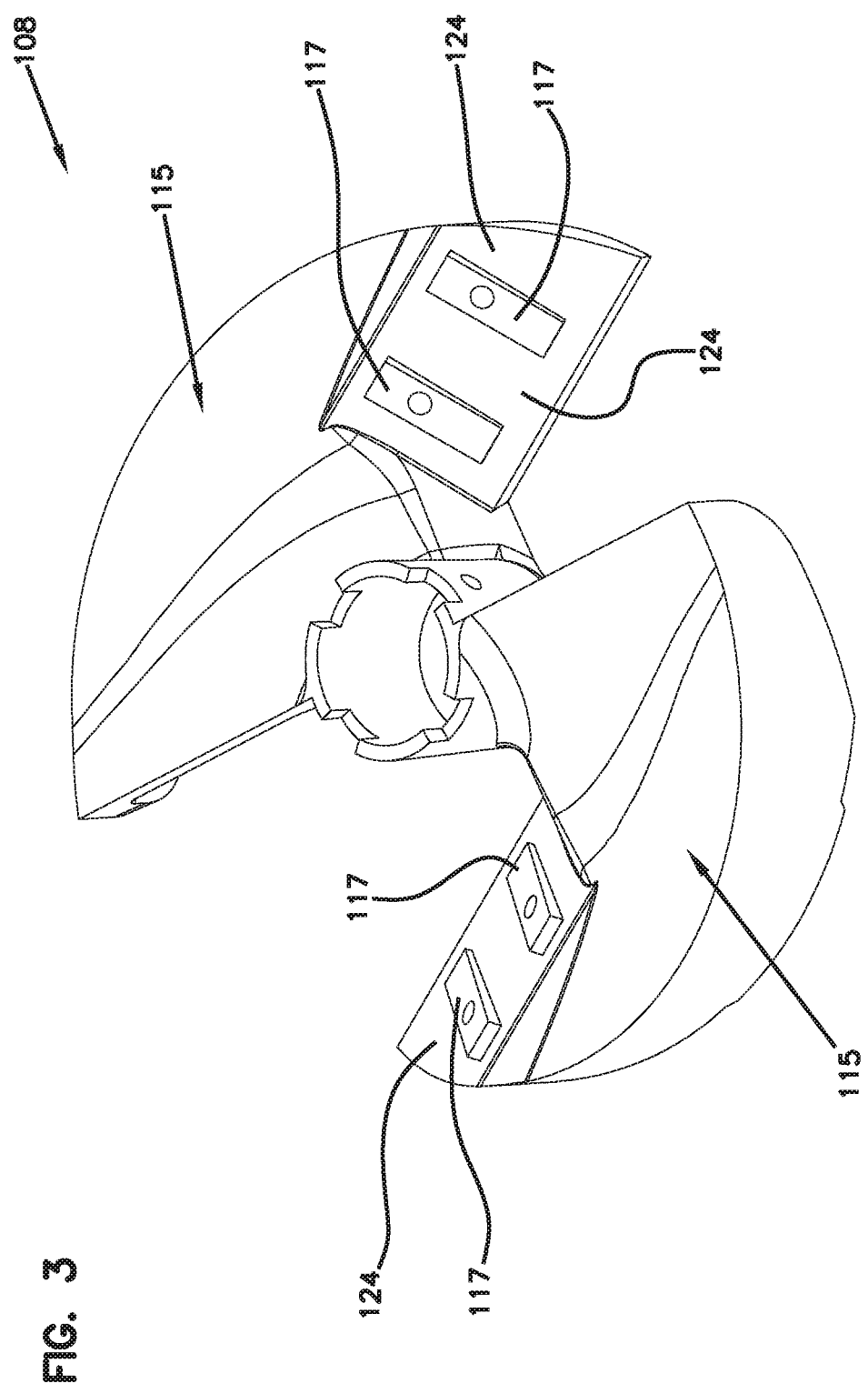
FIG. 3 illustrates a top perspective view of the cutting head of the ice drill of FIG. 1 without cutting blades mounted.

FIG. 3 shows a top perspective view of the cutting head 108 with the cutting blades 116 removed. The main body includes blade pads 117 positioned at the mounting locations 124 of the cutting blades 116. The blade pads 117 are configured to allow for fine tuning of the position of the cutting blades 116 on the mounting locations 124. For example, the blade pads 117 can be altered (i.e., trimmed, milled, grinded, etc.) to change the mounting of the cutting blades 116. This allows for proper positioning of the cutting blades 116 so as to allow identical replacement blades to be identically mounted. In some examples, when the main body 115 is cast, altering the blade pads 117 allows for precise positioning of the cutting blades 116, which is difficult to achieve in the metal casting process.

Figure 4:
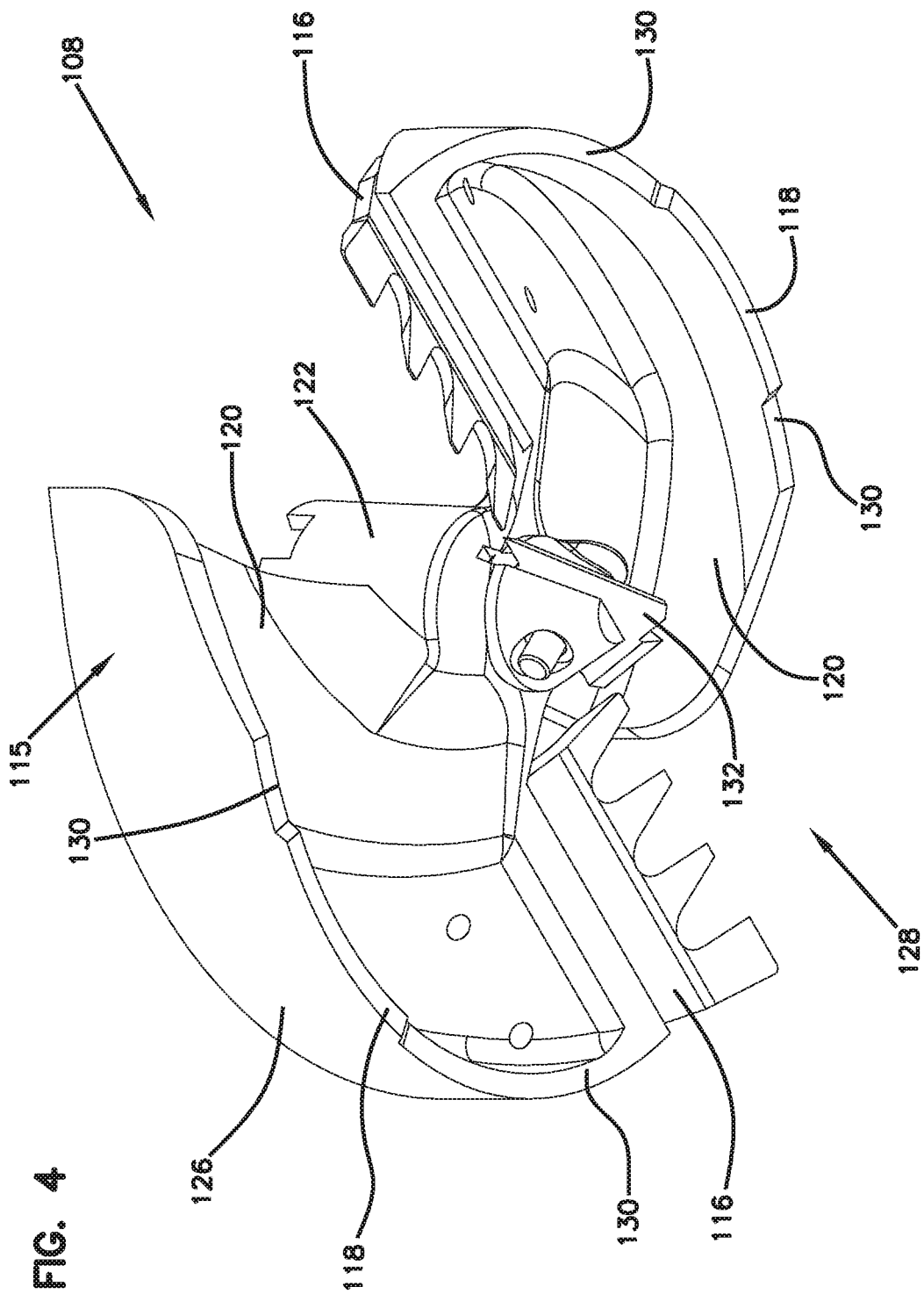
FIG. 4 illustrates a bottom perspective view of the cutting head of the ice drill of FIG. 1.

FIG. 4 shows a bottom perspective view of the cutting head 108. At a bottom side 128, the cutting head 108, specifically the cutting blades 116, is configured to perform a cutting operation. Further, the main body 115, at the bottom side 128, includes a bottom peripheral surface 130 that is disposed on the bottom side and outer edge of each wing 120. Cutting rate control pads 118 are disposed on the bottom side 128 of the main body 115 at the bottom peripheral surface 130. Specifically, the cutting rate control pads 118 extend away from the bottom peripheral surface 130.

The main body 115 also includes a center grinding blade 132 disposed on the bottom side 128. The center grinding blade 132 controls the cutting rate per drill revolution. Further, the center grinding blade 132 aids in preventing cutting head 108 from walking across the ice surface 112.

The bottom peripheral surface 130 is a surface defined by the main body 115. In the depicted example, the bottom peripheral surface 130 is the outer most surface on the bottom side 128 of the main body. In the depicted example, the bottom peripheral surface 130 is located on the bottom of each wing 120 and, due to the position of the cutting blades 116, the bottom peripheral surface 130 does not travel around the entire perimeter of the cutting head 108. In other examples, the bottom peripheral surface 130 can be positioned around nearly the entire perimeter of the cutting head 108.

Figure 5:
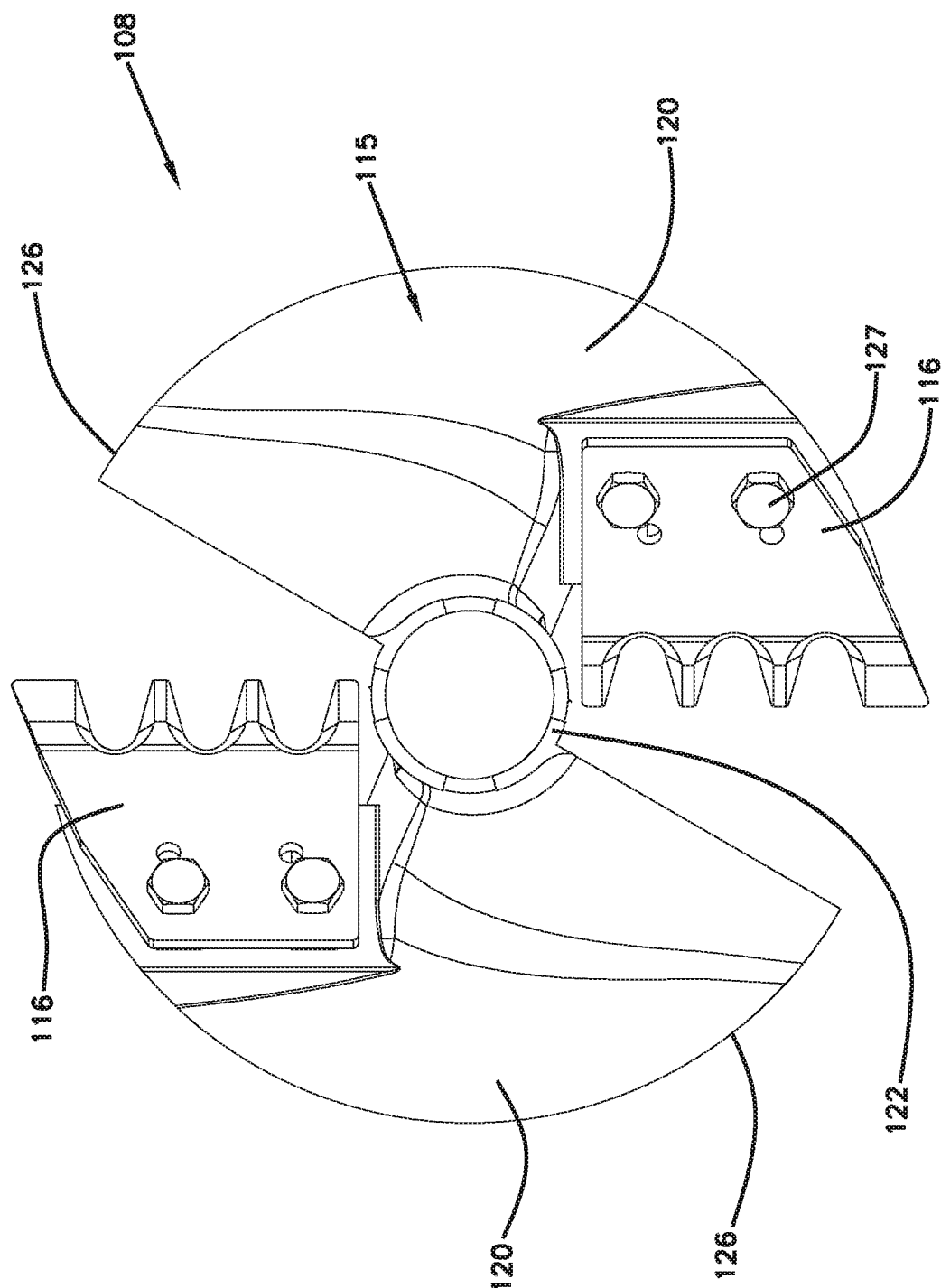
FIG. 5 illustrates a top view of the cutting head of the ice drill of FIG. 1.
Figure 6:
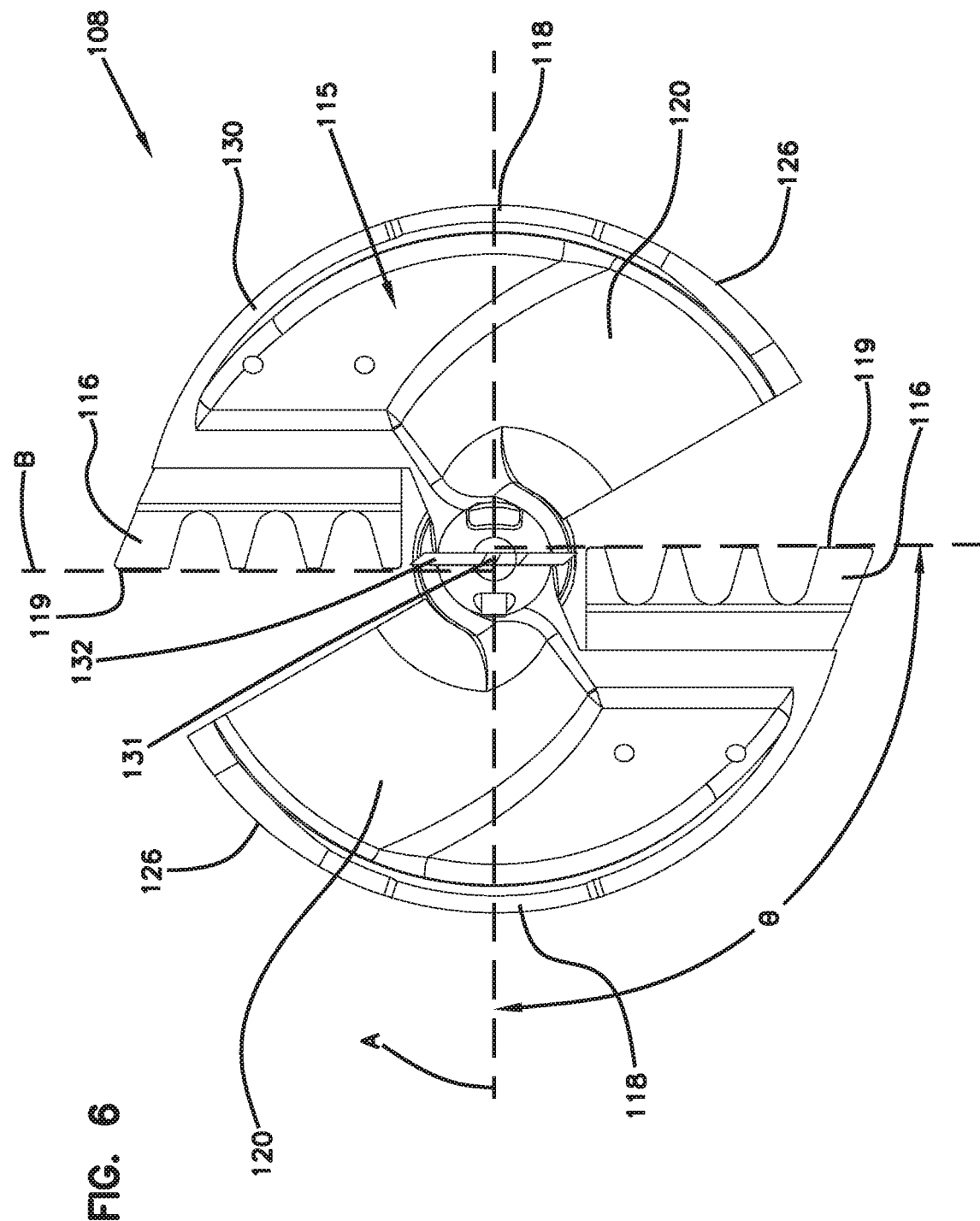
FIG. 6 illustrates a bottom view of the cutting head of the ice drill of FIG. 1.

FIG. 5 shows a top view of the cutting head 108. FIG. 6 depicts a bottom view of the cutting head 108. As shown, the cutting head 108 is generally circular in shape. Further, at least a portion of the cutting rate control pads 118 are located at an angle θ around the cutting head 108 from the leading edge 119 of the cutting blades 116. In some examples, the angle θ is between about 85 degrees and about 105 degrees. In some examples, the angle θ is about 90 degrees. In some examples, the cutting rate control pads 118 are bisected by planes A, B that intersect with a tip 131 of the center grinding blade 132.

Figure 7:
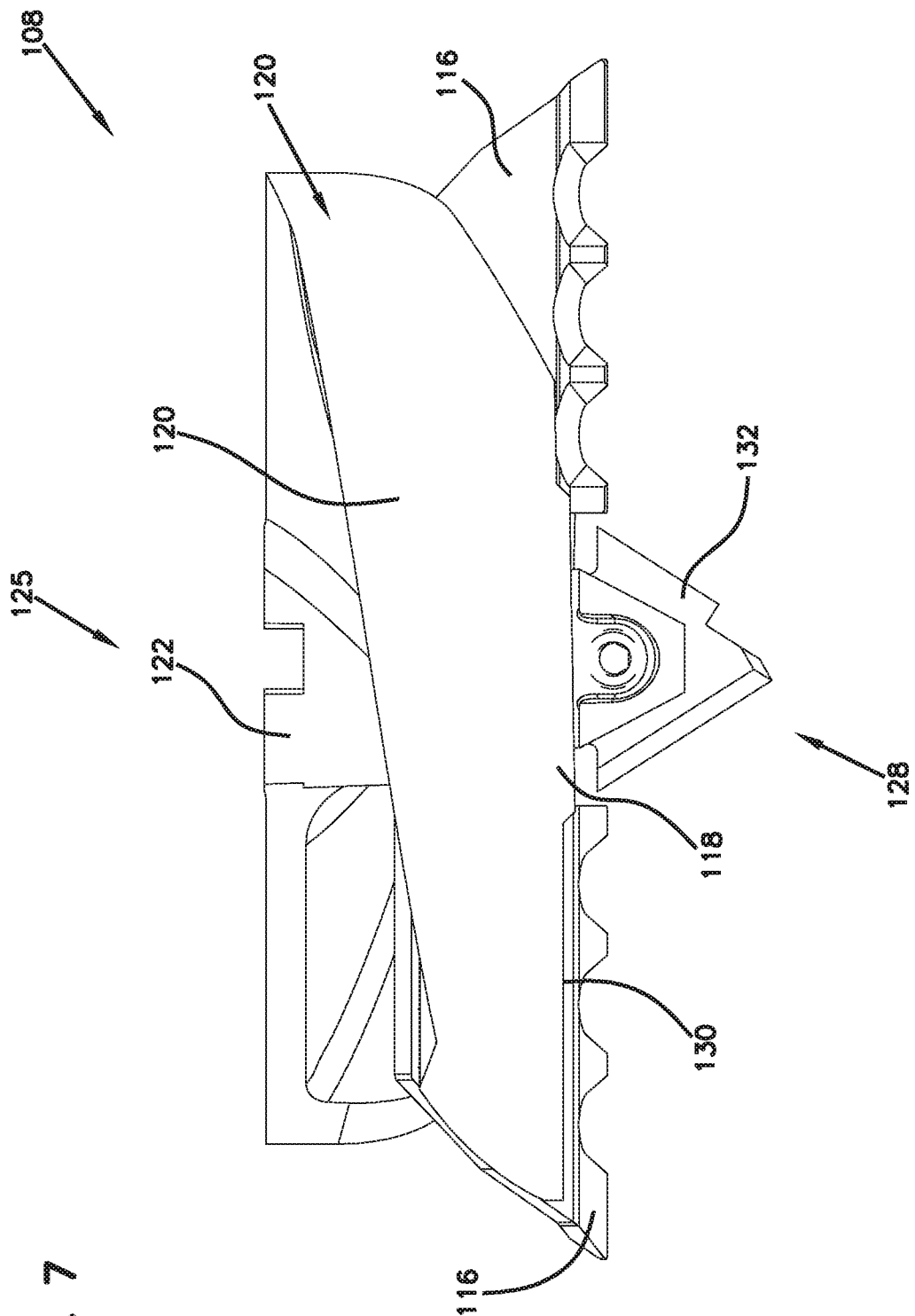
FIG. 7 illustrates a side view of the cutting head of the ice drill of FIG. 1.

FIG. 7 shows a side view of the cutting head 108. As shown, the cutting rate control pads 118 extend away from the bottom peripheral surface 130. In some examples, the cutting rate control pads 118 can be adjusted by the product designer to control the cutting rate of the cutting head 108. The cutting rate control pads 118 prevent the cutting blades 116 from penetrating too far into the ice surface 112 and cutting too rapidly, which requires more torque to be supplied by the motor 102. When using an electric motor, it is advantageous to keep the load low on the motor to increase the life of the battery that is powering the electric motor, which can also increase the life of the electric motor. In some examples, the cutting rate control pads 118 control the cutting rate of the cutting head 108 so as to increase the number of inches drilled per battery when using a battery powered electric motor.

Further, the cutting rate control pads 118 are sized and shaped to control the cutting rate of the cutting head 108 so as to require little input from the operator to effectively drill a hole in the ice surface. This aids in reducing operator fatigue, reducing the level of expertise needed to drill holes (i.e., pushing down will have little effect on the drill cutting rate), and improving operator safety because the ice drill behaves predictably.

Also, the cutting rate control pads 118 control the cutting rate of the cutting head 108 so as to reduce the cutting head 108 from sticking and grabbing at the bottom of the hole 110 at the point of break through. This also increases the ease of operability of the ice drill 100 and reduces the opportunity for injury due to the ice drill 100 stopping unexpectedly.

In some examples, the cutting rate control pads 118 are integrally formed with the main body 115 of the cutting head 108. In other examples, the cutting rate control pads 118 are removably attached to the main body 115 via a fastener such as at least a bolt, adhesive, or other like fastening device. In some examples, the cutting rate control pads 118 include a low friction coating such as polytetrafluoroethylene. In other examples still, the cutting rate control pad 118 is constructed of a different material than the main body 115 such as a low friction polymer (e.g. polyethene).

Figure 8:
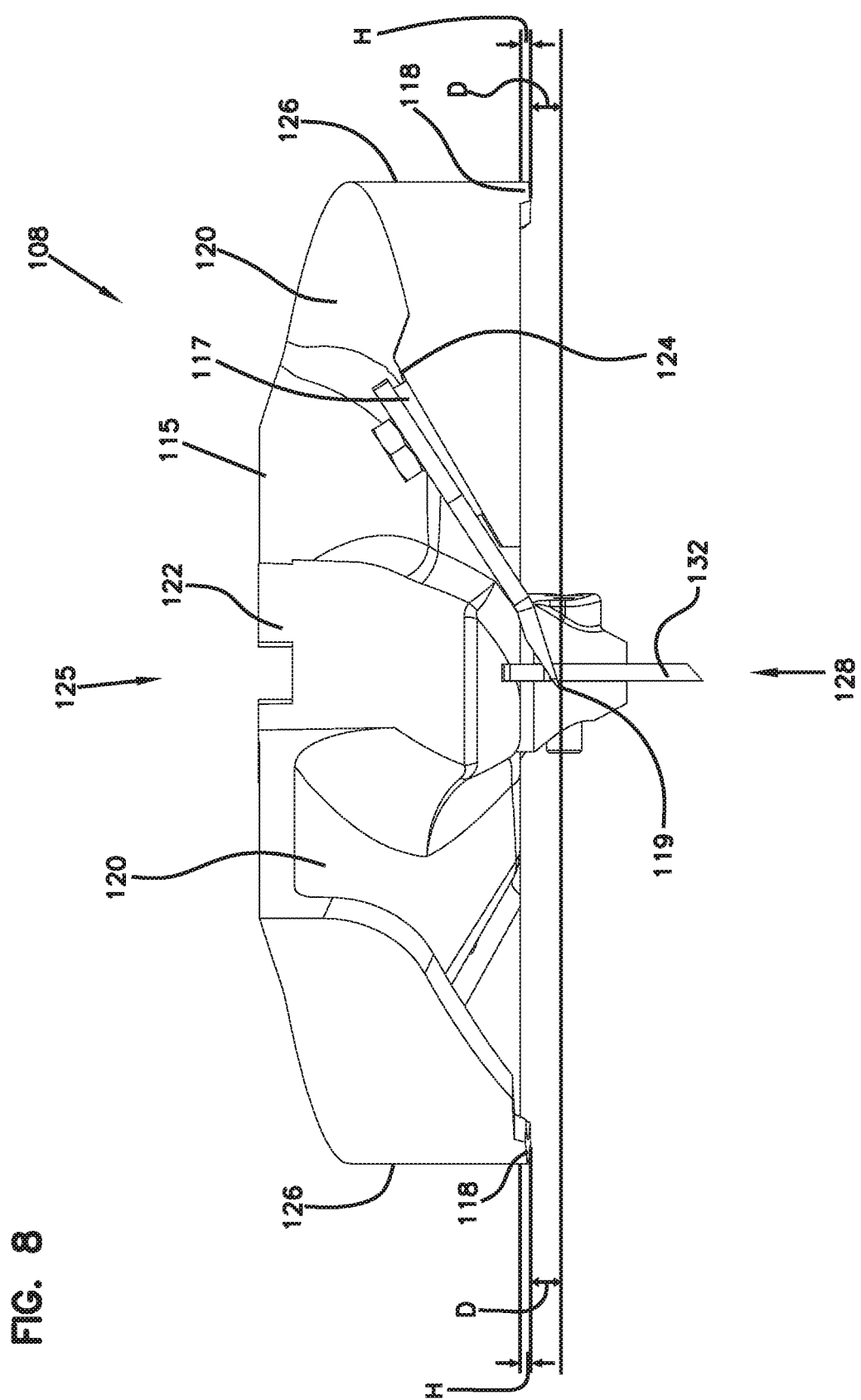
FIG. 8 illustrates another side view of the cutting head of the ice drill of FIG. 1.

FIG. 8 shows another side view of the cutting head 108. The cutting rate control pads 118 have a height H that is a variable. In some examples, the cutting rate control pads 118 have a height H, measured from the bottom peripheral surface 130, between about 0.025 inches and about 0.125 inches. In some examples, the height H of the cutting rate control pads is about 0.075 inches.

As shown, the leading edge 119 of the cutting blade 116 is vertically offset at a distance D lower than the cutting rate control pads 118. In some examples, the distance D is between about 0.180 inches and about 0.220 inches. In some examples, the distance D is about 0.200 inches.

Figure 9:
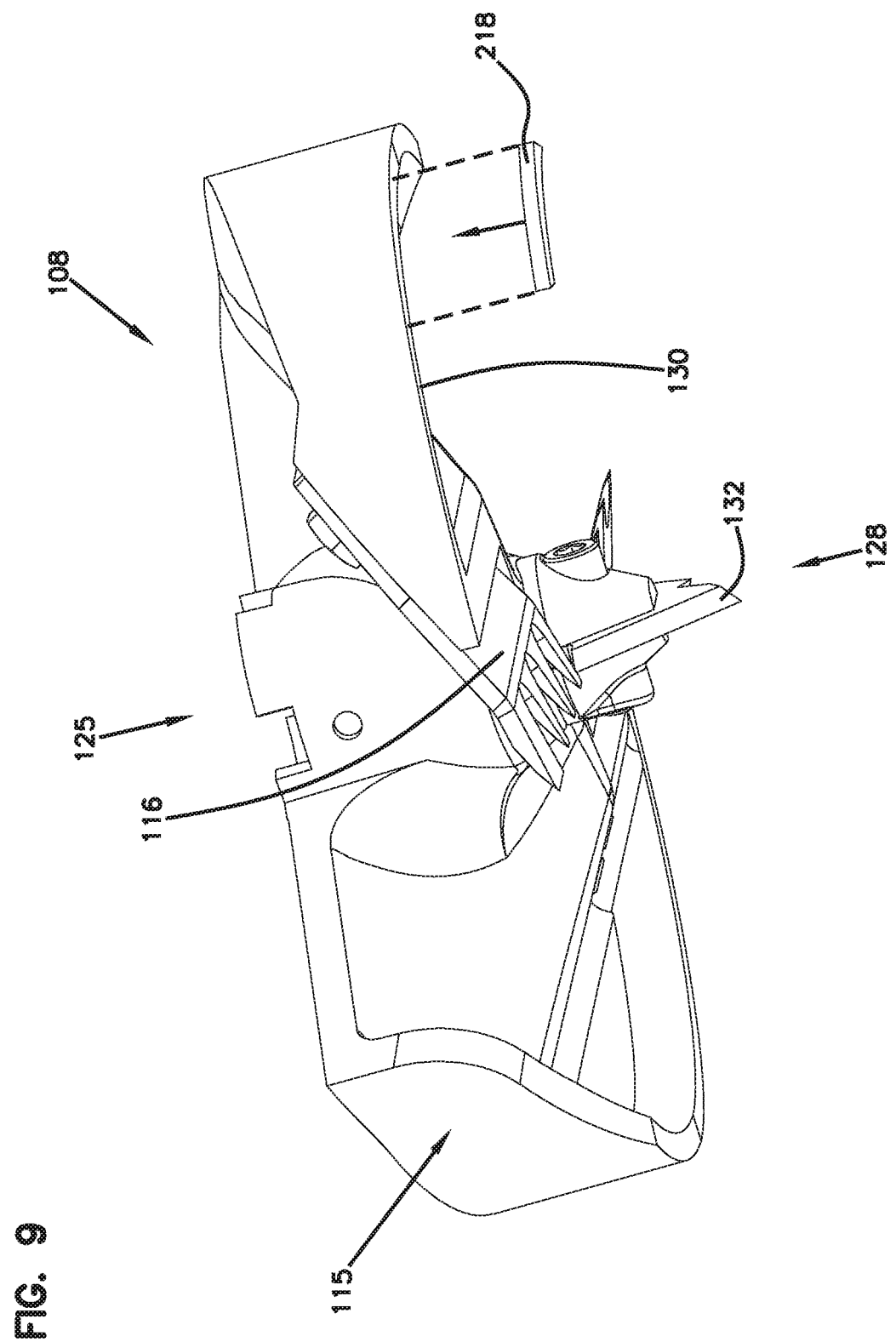
FIG. 9 illustrates a perspective view of the cutting head of the ice drill of FIG. 1 utilizing a removable cutting rate control pad.

FIG. 9 shows a cutting rate control pad 218 according to one embodiment of the present disclosure. Specifically, the cutting rate control pad 218 is removable from the cutting head 108 so that it can be replaced. The user may choose to replace the cutting rate control pads 218 if they become worn or if a different cutting rate is desired. In some examples, the cutting rate control pad 218 can be attached to the cutting head 108 using a variety of methods. For example, the cutting rate control pad 218 can be attached to the cutting head 108 by a weld, a fastener, an adhesive, or other like method. In some examples, the cutting head 108 is configured to receive a plurality of cutting rate control pads 218 at different locations on the cutting head 108.

FIG. 10 shows a cutting rate control pad 318a according to one embodiment of the present disclosure. Specifically, the cutting rate control pad 318a is both removable from the cutting head 108 and also configured to receive multiple auxiliary cutting rate control pads 318b, 318c stacked thereon. In some examples, the auxiliary cutting rate control pads 318b, 318c can be added to alter the cutting rate and also to account for wear of the control pads 318a. In some examples, only a single auxiliary cutting rate control pad can be utilized, and in other examples, a plurality of auxiliary cutting rate control pads can be utilized. In some examples, a fastener 319 can be used to secure the cutting rate control pads 318a, 318b, 318c to the cutting head 108. In other examples, a set of fasteners 319 can be used to secure the cutting rate control pads 318a, 318b, 318c to the cutting head. As noted above, the cutting rate control pads 318a, 318b, 318c can be attached to the cutting head 108 using a variety of methods. For example, the cutting rate control pads 318a, 318b, 318c can be attached to the cutting head 108 by a weld, a fastener, an adhesive, or other like method. In some examples, the cutting head 108 is configured to receive a plurality of cutting rate control pads 318a, 318b, 318c at different locations on the cutting head 108.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. An ice drill comprising:
    a motor;
    a drive shaft attached to the motor at a first end;
    an auger assembly attached to the drive shaft;
    a cutting head attached to a second end of the drive shaft, the cutting head including:
        a main body having a top side and a bottom side, the bottom side defining a bottom peripheral surface that defines a first surface configured to be positioned generally parallel to and directly face toward an ice surface during operation of the ice drill without an intermediate structure positioned between the first surface and the ice surface;
        a center blade disposed on the bottom side of the main body, wherein the center blade is configured to control lateral movement of the cutting head;
        at least one cutting edge disposed on the main body, the cutting edge being configured to perform a cutting operation at the bottom side of the main body; and
        at least one cutting rate control pad disposed on the bottom side of the main body, wherein the at least one cutting rate control pad extends away from the bottom peripheral surface;
        wherein the at least one cutting edge is spaced away at a first distance, in a direction away from the bottom side of the main body, from an ice interfacing surface of the at least one cutting rate control pad, the ice interfacing surface being configured to contact the ice surface during a drilling operation; and
wherein the first distance is between about 0.180 inches and about 0.220 inches.

2. The ice drill of claim 1, wherein the auger assembly has a plurality of flights, wherein the flights are configured to alter the length of the auger assembly.

3. The ice drill of claim 1, wherein the first distance is 0.200 inches.

4. The ice drill of claim 1, wherein the at least one cutting rate control pad is removable from the main body.

5. The ice drill of claim 1, wherein the at least one cutting rate control pad is integrally formed with the main body.

6. The ice drill of claim 1, wherein the motor is an electric motor.

7. The ice drill of claim 1, wherein the main body includes a blade pad configured to receive a cutting blade having the at least one cutting edge, the blade pad being positioned at the top side of the main body, wherein the blade pad is configured for allowing fine tuning of the position of the cutting blade.

8. The ice drill of claim 1, further comprising a plurality of cutting rate control pads disposed on the bottom side of the main body.

9. The ice drill of claim 1, further comprising a plurality of cutting edges disposed on the main body.

10. The ice drill of claim 1, wherein the at least one cutting edge is a removable blade attached to the main body.

11. The ice drill of claim 1, wherein the main body includes a pair of wings extending outwardly from a center body, the pair of wings each including cutting edges disposed thereon and cutting rate control pads disposed on bottom surfaces thereof.

12. An ice drill comprising:
a motor;
a drive shaft attached to the motor at a first end;
an auger assembly attached to the drive shaft;
a cutting head attached to a second end of the drive shaft, the cutting head including:
a main body having a top side and a bottom side, the bottom side defining a bottom peripheral surface that defines a first surface configured to be positioned generally parallel to and directly face toward an ice surface during operation of the ice drill without an intermediate structure positioned between the first surface and the ice surface, wherein the main body includes a blade pad positioned at the top side of the main body;
at least one cutting blade mounted to a top surface of the blade pad of the main body, the at least one cutting blade being configured to perform a cutting operation at the bottom side of the main body, wherein the blade pad is configured for allowing fine tuning of the position of the at least one cutting blade; and
at least one cutting rate control pad disposed on the bottom side of the main body, wherein the at least one cutting rate control pad extends away from the bottom peripheral surface;
wherein the at least one cutting blade is spaced away at a first distance, in a direction away from the bottom side of the main body, from an ice interfacing surface of the cutting rate control pad, the ice interfacing surface being configured to contact the ice surface during a drilling operation.

13. The ice drill of claim 12, wherein the main body is cast metal.

14. The ice drill of claim 12, wherein the main body includes a pair of wings extending outwardly from a center body, the pair of wings each including blade pads each configured to receive a cutting blade.

15. The ice drill of claim 14, wherein cutting rate control pads are disposed on bottom surfaces of the wings.

16. The ice drill of claim 15, wherein the first distance is between about 0.180 inches and about 0.220 inches.

17. A cutting head for an ice drill comprising:
a main body attachable to an ice drill shaft at a top side, the main body including a bottom side having a bottom peripheral surface that defines a first surface configured to be positioned generally parallel to and directly face toward an ice surface during operation of the ice drill without an intermediate structure positioned between the first surface and the ice surface, wherein the main body includes a blade pad positioned at the top side of the main body;
at least one cutting blade mounted to a top surface of the blade pad of the main body, the at least one cutting blade being configured to perform a cutting operation at the bottom side of the main body, wherein the blade pad is configured for allowing fine tuning of the position of the at least one cutting blade; and
a cutting rate control pad disposed on the bottom side of the main body, wherein the cutting rate control pad extends away from the bottom peripheral surface;
wherein the at least one cutting blade is spaced away at a first distance, in a direction away from the bottom side of the main body, from an ice interfacing surface of the cutting rate control pad, the ice interfacing surface being configured to contact the ice surface during a drilling operation.

18. The cutting head of claim 17, wherein the first distance is between about 0.180 inches and about 0.220 inches.

19. The cutting head of claim 17, wherein the cutting head is attached to an ice drill, the ice drill including a motor.

20. The cutting head of claim 17, wherein the cutting rate control pad is removable from the main body.

* * * * *